Dec. 29, 1936.  F. W. REISERT  2,065,745
REAR VISION DEVICE FOR VEHICLES
Filed Aug. 17, 1934  2 Sheets-Sheet 1
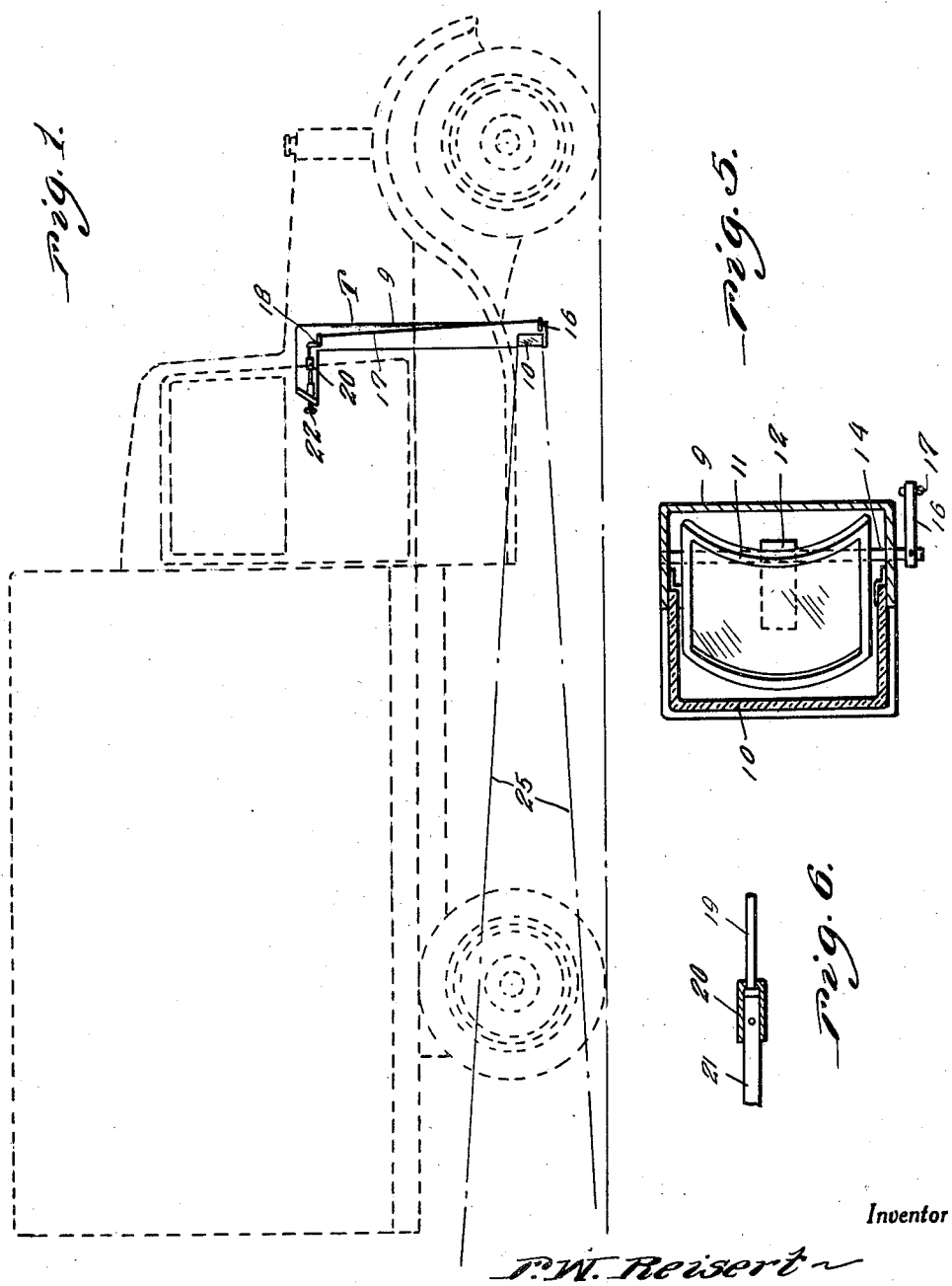
Inventor
F. W. Reisert
By Clarence A. O'Brien
Attorney

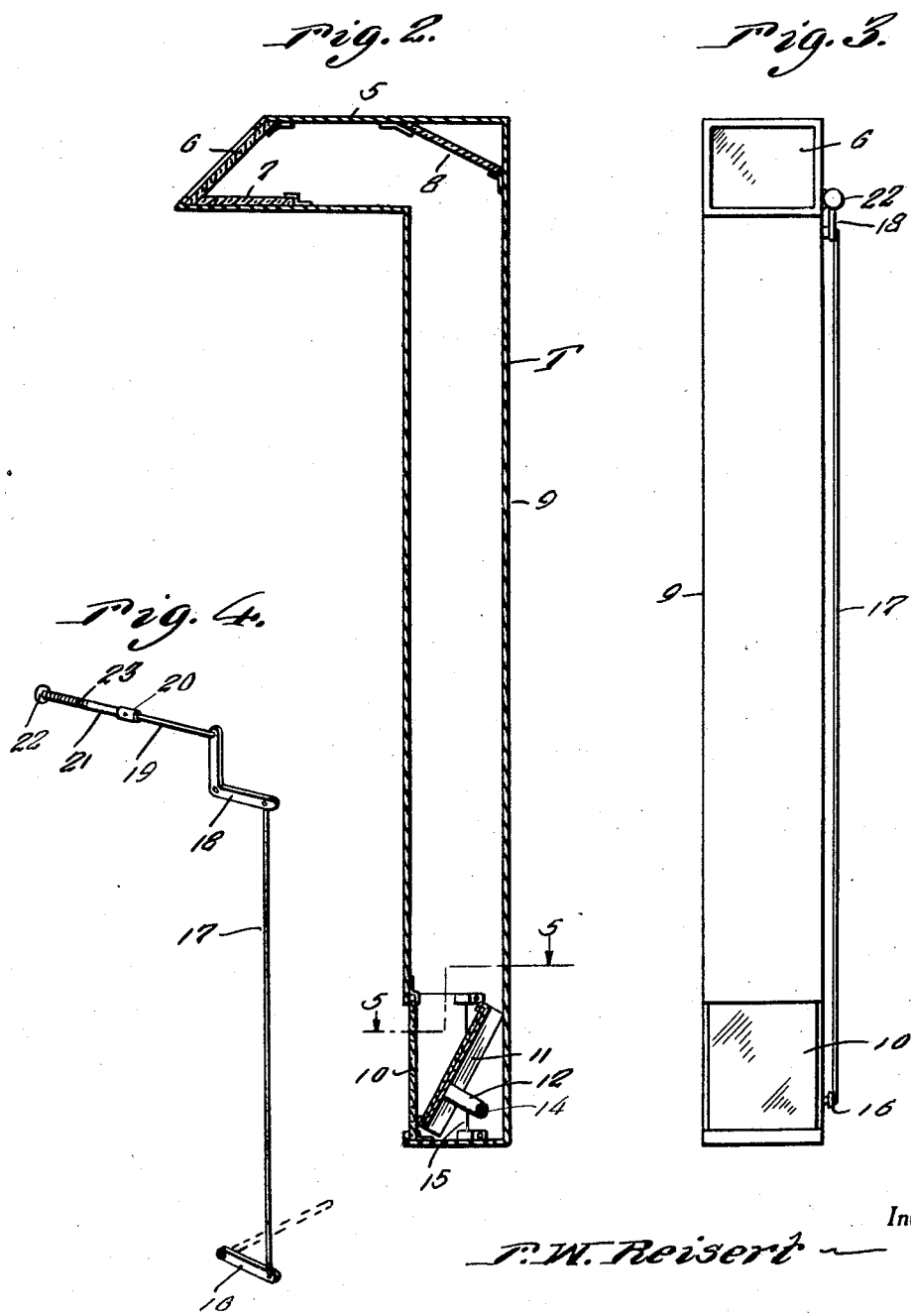

Patented Dec. 29, 1936

2,065,745

UNITED STATES PATENT OFFICE 2,065,745

REAR VISION DEVICE FOR VEHICLES

Fred William Reisert, Monmouth Junction, N. J.

Application August 17, 1934, Serial No. 740,341

1 Claim. (Cl. 88—70)

The present invention relates to a rear vision device for vehicles particularly adapted for use on trucks and the like in order that the driver may readily ascertain the presence and position of oncoming vehicles in the rear.

The object of the invention resides in the provision of a device of this nature which is exceedingly simple in its construction, inexpensive to manufacture and install, thoroughly efficient and reliable in use, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a side elevation of the device showing the same in use.

Figure 2 is a vertical section therethrough.

Figure 3 is a rear elevation thereof.

Figure 4 is a perspective view of the operating or adjusting mechanism,

Figure 5 is a horizontal detail section taken substantially on the line 5—5 of Figure 2, and Figure 6 is a detail sectional view showing the connection between the operating knob and links.

Referring to the drawings in detail it will be seen that the letter T denotes a substantially inverted L-shaped tubular member the upper horizontal leg 5 of which has a beveled terminal with a transparent panel 6 mounted therein inclining upwardly and forwardly with respect to the vehicle in which the device is installed. A mirror 7 is mounted in the leg 5 at the bottom thereof and at the opening thereof to be horizontally disposed. A diagonally disposed mirror 8 is mounted in the juncture of the leg 5 with the vertical leg 9. The bottom end of the leg 9 is closed and the rear side wall adjacent the closure has a transparent panel 10 mounted therein. A horizontally arcuate mirror 11 is mounted in the bottom of the leg 9 to be swingable by means of a lug 12 on a shaft 14 mounted in a bracket structure 15 rising from the bottom or closed end of the leg 9. The shaft 14 is controlled by a crank 16 to which is pivotally connected an elongated link 17 engaged with the bell crank lever 18 suitably mounted adjacent the dash or instrument board of the truck. A link 19 is engaged with the other end of the bell crank and has a connection 20 with a rod 21 terminating in an operating knob 22. A spring 23 on the rod 21 holds the knob inwardly so that the mirror 11 is in a normal position. The operator of the truck may push in the knob 22 and adjust the mirror 11 to meet conditions whereby a line of sight to the rear may be obtained along the dash and dot lines 25 shown in Figure 1.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A rear vision device for automobiles, the latter embodying a driver's compartment and an instrument board confronting the driver's compartment, comprising a stationary inverted L-shaped tubular member adapted for attachment to the automobile so that the legs of the members are arranged vertically and horizontally, the free end of the horizontally arranged leg terminating in the driver's compartment within the view of the driver, the free end of the vertically arranged leg terminating free of the automobile and equipped with a rearwardly directed opening so as to obtain an unobstructed view of objects to the rear, a mirror rockably mounted in the vertical leg adjacent the opening to reflect images into the interior of the tube, additional mirrors arranged in the interior of the legs to transmit the reflected image to the free end of the horizontal leg where the image may be viewed by the driver, a bell crank lever rockable on the member, a link connecting one arm of the bell crank lever with the rockable mirror and a second link connected with the other arm of the bell crank lever, the free end of the second link terminating in the driver's compartment adjacent the instrument board so as to permit the adjustment of the rockable mirror from the driver's compartment.

FRED WILLIAM REISERT.